United States Patent
Dasgupta et al.

(10) Patent No.: US 10,394,269 B2
(45) Date of Patent: Aug. 27, 2019

(54) PHOTONIC HARVESTING STRING CONFIGURATION

(71) Applicant: International Business Machines Corporation, Armonk, NY (US)

(72) Inventors: Kalyan Kanti Dasgupta, Bangalore (IN); Pankaj S. Dayama, Bangalore (IN); Jagabondhu Hazra, Bangalore (IN); Shivkumar Kalyanaraman, Bangalore (IN); Manikandan Padmanaban, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 15/807,061

(22) Filed: Nov. 8, 2017

(65) Prior Publication Data

US 2019/0138042 A1 May 9, 2019

(51) Int. Cl.
| | |
|---|---|
| *G05F 1/67* | (2006.01) |
| *G05D 3/10* | (2006.01) |
| *H02J 3/38* | (2006.01) |
| *H02S 40/22* | (2014.01) |

(52) U.S. Cl.
CPC ............ *G05F 1/67* (2013.01); *G05D 3/105* (2013.01); *H02J 3/385* (2013.01); *H02S 40/22* (2014.12)

(58) Field of Classification Search
CPC . G05F 1/67; H02S 40/22; G05D 3/105; H02J 3/385
See application file for complete search history.

(56) References Cited

U.S. PATENT DOCUMENTS

2009/0151769 A1 6/2009 Corbin
2012/0112557 A1 5/2012 Sager
(Continued)

OTHER PUBLICATIONS

Hosseini, R. et al., "An experimental study of combining a photovoltaic system with a heating system", World Renewable Energy Congress, May 8-13, 2011, Linkoping, Sweden, 8 pages, Photovoltaic Technology (PV).

(Continued)

*Primary Examiner* — Robert L Deberadinis
(74) *Attorney, Agent, or Firm* — Ference & Associates LLC (57) ABSTRACT

One embodiment provides a method, including: receiving photovoltaic output from a solar module, the solar module comprising a plurality of solar panels electronically connected together by a plurality of strings, wherein the photovoltaic output corresponding to any given one of the strings is limited by the lowest performing solar panel in said given one of the strings; determining a reflection profile for the solar module, wherein the reflection profile describes an illumination pattern of light incident onto the solar module; and increasing, based upon the determined reflection profile, the photovoltaic output of the solar module to match a requested photovoltaic output, wherein the increasing comprises electrically reassigning one or more solar panels within the solar module from one string to a different string, such that each string electrically ties together solar panels that produce a photovoltaic output within a predetermined range of each other.

20 Claims, 4 Drawing Sheets

(56) References Cited

U.S. PATENT DOCUMENTS

| | | | |
|---|---|---|---|
| 2012/0313455 A1* | 12/2012 | Latham | H01L 31/02021 |
| | | | 307/117 |
| 2014/0150852 A1 | 6/2014 | Holze | |
| 2016/0087132 A1 | 3/2016 | Alteneiji | |
| 2017/0033733 A1 | 2/2017 | Chandan et al. | |
| 2017/0257061 A1 | 9/2017 | Chandan et al. | |
| 2018/0248509 A1 | 8/2018 | Dayama et al. | |

OTHER PUBLICATIONS

Lin, Wei-Chun, "Non-Tracked Mirror-Augmented Photovoltaic Design and Performance", Thesis Paper, Department of Material Science and Engineering, Case Western Reserve University, Dec. 2012, 83 pages.

Moharram, K.A. et al., "Enhancing the performance of photovoltaic panels by water cooling", Ain Shams Engineering Journal, Ain Shams University, 2013, pp. 869-877, vol. 4, Elsevier, Amsterdam, Netherlands.

\* cited by examiner

PHOTONIC HARVESTING STRING CONFIGURATION

BACKGROUND

The world has significant energy needs. Energy is used to power everything from clocks and mobile devices to cars and buildings. Some energy needs are met through the use of energy storage devices, for example, batteries, accumulators, and the like. Other energy needs are met through the use of produced energy, which is then directed to the power grid accessible by different energy consumers (e.g., homes, businesses, facilities, etc.). The energy needs for the energy consumers varies throughout the day and night, and energy needs may be greater or less than what the power grid can provide. The energy providers adjust to this difference in demand by either increasing or by reducing the energy supplied to the power grid. One way to increase/reduce the energy supplied to the grid is to increase/decrease the amount of energy produced by energy producers (e.g., non-renewable energy power plants, renewable energy power producers, etc.).

During the day and night, the demand for energy can fluctuate, sometimes very quickly. Accordingly, power plants are divided into base load power plants and peak load power plants. Base load power plants generally maintain a constant energy output that satisfies a minimum amount of energy demand. Typically, base load power plants are plants that have a constant energy supply, for example, nuclear power plants, coal power plants, and the like. The peak load power plants generally supply energy when there is a high demand for energy. Thus, peak load power plants are energy producers that are able to be stopped and started quickly. Additionally, power plants which do not have a constant energy supply (e.g., solar power, wind power, etc.) are typically used as peak load power plants, rather than base load power plants.

BRIEF SUMMARY

In summary, one aspect of the invention provides a method, comprising: utilizing at least one processor to execute computer code that performs the steps of: receiving photovoltaic output from a solar module, the solar module comprising a plurality of solar panels electronically connected together by a plurality of strings, wherein each of the plurality of solar panels is assigned to only one of the plurality of strings, and wherein the photovoltaic output corresponding to any given one of the strings is limited by the lowest performing solar panel in said given one of the strings; determining a reflection profile for the solar module, wherein the reflection profile describes an illumination pattern of light incident onto the solar module; and increasing, based upon the determined reflection profile, the photovoltaic output of the solar module to match a requested photovoltaic output, wherein the increasing comprises electrically reassigning one or more solar panels within the solar module from one string to a different string, such that each string electrically ties together solar panels that produce a photovoltaic output within a predetermined range of each other.

Another aspect of the invention provides an apparatus, comprising: at least one processor; and a computer readable storage medium having computer readable program code embodied therewith and executable by the at least one processor, the computer readable program code comprising: computer readable program code configured to receive photovoltaic output from a solar module, the solar module comprising a plurality of solar panels electronically connected together by a plurality of strings, wherein each of the plurality of solar panels is assigned to only one of the plurality of strings, and wherein the photovoltaic output corresponding to any given one of the strings is limited by the lowest performing solar panel in said given one of the strings; computer readable program code configured to determine a reflection profile for the solar module, wherein the reflection profile describes an illumination pattern of light incident onto the solar module; and computer readable program code configured to increase, based upon the determined reflection profile, the photovoltaic output of the solar module to match a requested photovoltaic output, wherein the increasing comprises electrically reassigning one or more solar panels within the solar module from one string to a different string, such that each string electrically ties together solar panels that produce a photovoltaic output within a predetermined range of each other.

An additional aspect of the invention provides a computer program product, comprising: a computer readable storage medium having computer readable program code embodied therewith, the computer readable program code executable by a processor and comprising: computer readable program code configured to receive photovoltaic output from a solar module, the solar module comprising a plurality of solar panels electronically connected together by a plurality of strings, wherein each of the plurality of solar panels is assigned to only one of the plurality of strings, and wherein the photovoltaic output corresponding to any given one of the strings is limited by the lowest performing solar panel in said given one of the strings; computer readable program code configured to determine a reflection profile for the solar module, wherein the reflection profile describes an illumination pattern of light incident onto the solar module; and computer readable program code configured to increase, based upon the determined reflection profile, the photovoltaic output of the solar module to match a requested photovoltaic output, wherein the increasing comprises electrically reassigning one or more solar panels within the solar module from one string to a different string, such that each string electrically ties together solar panels that produce a photovoltaic output within a predetermined range of each other.

A further aspect of the invention provides a method, comprising: utilizing at least one processor to execute computer code that performs the steps of: receiving information related to a desired photovoltaic output of a solar module comprising at least one photonic reflector, wherein the solar module comprises a plurality of solar panels electronically connected together by a plurality of strings, wherein each of the plurality of solar panels is assigned to only one of the plurality of strings, and wherein the photovoltaic output corresponding to any given one of the strings is limited by the lowest performing solar panel in said given one of the strings; identifying a photonic profile with respect to the solar module, wherein the photonic profile identifies (i) the intensity of sunlight on each panel of the solar module and (ii) the position of the sunlight with respect to each of the solar panels of the solar module; and adjusting photovoltaic output of the solar module by adjusting the photonic reflector, wherein the adjusting the photonic reflector comprises adjusting at least one characteristic of the photonic reflector to create a new photonic profile, wherein the new photonic profile comprises one resulting in an increase in the photovoltaic output as compared with a previous photonic profile; and wherein the adjusting comprises electrically reassigning one or more solar panels within the solar module from one string to a different string such that each string comprises (i) solar panels producing a photovoltaic output within a predetermined range of each of the other solar panels within the string and (ii) decreases a loss of photovoltaic output due to the azimuth effect.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

The desire to decrease the carbon footprint and pollution, especially as produced by energy generation facilities, has made renewable energy sources (e.g., wind, water, solar, etc.) crucial. Renewable energy sources (e.g., wind, water, solar, etc.) are widely regarded as being important to the future of energy generation. However, due to the instability and volatility of some renewable energy sources, power plants using those energy sources may only be used to assist in meeting peak demand loads. Additionally, since the power production of these renewable energy sources is directly dependent on an uncontrollable force (e.g., sunlight, wind, waves, etc.) it may be difficult to ensure maximum production and to consistently produce a requested power output.

In order to account for this volatility, the power generation from an energy producer using renewable energy sources may be curtailed, meaning that the requested output power will be less than the actual amount of power that can be produced by the facility. Such a technique helps to ensure that the forecasted amount of power needed by the power grid will be able to be met using all energy producers within the power grid. However, one problem with this is that any excess energy produced by the facility will be wasted or may have to be stored in on-site energy storage facilities, which increases reliance on the non-renewable energy producers. An additional problem is that produced energy may end up being wasted.

Since the production of solar energy is directly dependent on the amount of sunlight, a solar energy system may experience sharp and quick increases and decreases in the amount of energy that can be generated. For example, photovoltaic output may drop by 80% within a few seconds. Such sudden and dramatic increases and decreases can impact the electromechanical dynamics of the system, which may create severe frequency oscillations. This may lead to malfunctions of the protections systems and may trigger cascading failures or massive blackouts.

A solar energy generation system may also suffer from mid-term volatility where the solar photovoltaic output may change over the course of a few minutes to a few hours. For example, the photovoltaic output may change due to cloud movements or temporary shadow effects; during cloud cover, the sunlight received by the photovoltaic panels is dramatically reduced as compared to when there is no cloud cover. Additionally, the amount of sunlight received by the photovoltaic panels varies throughout the day due to the different angles at which the sunlight hits the photovoltaic panels. At different angles the sun hits the photovoltaic panels less directly, and therefore the amount of irradiance received by the surface of the photovoltaic panel varies. (Irradiance is the radiant flux, or power, received by a surface per unit area.) Each photovoltaic panel has an optimal angle and orientation that most efficiently utilizes the irradiance. However, this angle and orientation vary as the sun angle varies throughout the day. The mid-term volatility impacts the load following capability of the grid and increases the required spinning reserve capacity. It can also create huge power swings in the grid which may lead to voltage collapse.

A solar energy generation system may also suffer from long term volatility. The amount of sunlight that will be available, and thus the amount of photovoltaic output that is possible, can be difficult to predict. Since energy providers need to bid in real time as well as for future generation (e.g., a day ahead, a week ahead, etc.), it can be difficult to accurately predict the amount of photovoltaic output that will be produced by the facility. If the energy generation facility is unable to meet the bid commitment, the facility may need to pay high penalties.

One technique for reducing the effect of the volatility of the solar energy production is to make the power production from the solar modules more stable, specifically by increasing the production of the solar modules to a maximum output value. In an effort to increase the production, reflectors have been added to the solar modules. The reflectors can then be controlled to reflect sunlight onto the solar modules, thereby increasing the portion of the solar module that receives sunlight, particularly when the angle of the sun is such that portions of the module may not receive the sunlight without the reflector. However, there are some problems with the current reflector additions. One problem with the reflectors is that they can cause the solar module with the addition of the reflector to become unstable, particularly in windy conditions. Additionally, with the addition of the reflectors it is difficult to clean the solar modules. Unclean solar modules can result in a reduction of the power output produced by the solar module.

An additional problem is that the reflectors are generally unable to be positioned such that the entire solar module receives an equal amount of direct sunlight or sunlight reflection. In other words, the reflection profile generated by the reflectors may not completely cover the solar module. Solar modules are made of many different solar panels that are electrically coupled together in series in what is referred to as a "string". These strings electrically couple two or more of the panels together as a set. The problem is that because the panels within a string are electrically connected in series, the output of the entire string is only as high as the panel producing the minimum output. In other words, the power output of the string is equal to the power output of the panel having the least power output. On the other hand, each string requires cabling and micro-inverters, so having a string for every panel is not feasible due to the cost associated with each string. Therefore, there exists a desire to reduce the total number of strings in an effort to reduce the cost of the solar modules.

Accordingly, the techniques and systems as described herein provide for dynamic configuration of solar panels electrically connected together as a string of solar panels ("string") in a solar module in order to increase the total power output from each solar module. The system receives a requested photovoltaic output for at least one solar module. The requested output may be used as the photovoltaic output reference and may be based upon the geographical location of the solar module, power grid requests, constraints (e.g., maintenance constraints, operating constraints, etc.), the configuration of the solar module and any reflectors, and the like. The solar module may include a plurality of solar panels electronically connected together within a plurality of strings. The strings may advantageously include cabling, micro-inverters, and other components that are used to electrically couple the panels within the string. Each string may include as few as a single solar panel to as many as all solar panels within the solar module.

The terms "reflector" and "photonic harvester" will be used interchangeably throughout this disclosure. The reflector or photonic harvester will be described in more detail below, but includes a portion of the overall system that does not collect solar energy to be converted to power as with a solar module or solar panel, but instead reflects sunlight from one position to another position, for example, onto the solar module. The term solar module will be used herein to refer to a configuration or module that is made up of a plurality of solar panels.

The system may identify a reflection profile for the solar module. The reflection profile may identify an irradiance profile with respect to the plurality of solar panels within the solar module. In other words, the reflection profile may identify the shape, outline, or location of the light incident onto (e.g., direct light, diffused light, reflected light, etc.) the solar module. The reflection profile may identify the location and/or position of not only the reflected light from the reflectors onto the solar module, but may also identify the location and/or position of the direct sunlight onto the solar module. Thus, the reflection profile may identify the position of the light onto the solar module with respect to each solar panel and may also identify the value of irradiance onto each panel of the solar module.

The system, based upon the reflection profile and the requested photovoltaic output, may increase the photovoltaic output of the solar module towards the requested photovoltaic output. If the solar module cannot meet the requested photovoltaic output, the system may optimize characteristics (e.g., stringing configuration, reflector position, reflection configuration, etc.) of the solar module to increase the output to an output that can be provided by the solar module.

To adjust the photovoltaic output, the system may modify the configuration of the plurality of strings, or electronically reassign the solar panels within strings, to connect solar panels that are receiving a similar irradiance. In other words, the string configurations may be adjusted so that the panels that can produce a similar output are connected together, so that the overall output of the string is not reduced due to a single panel that is producing a lower output. In order to optimize the output of the solar module, the system may also adjust a position or location of a photonic harvester with respect to the solar module. Adjusting the position or location of one or more photonic harvesters may include adjusting the gap between the harvester and the solar module, adjusting the height of the harvester with respect to the module, adjusting the position of the harvester, and the like. Adjusting the harvester may also be based upon an expected or actual wind load and may decrease the instability of the system in windy conditions.

Such a system provides a technical improvement over current solar harvesting systems. The systems and methods described herein provide a system and technique for dynamically adjusting the stringing configuration of a solar module in order to connect solar panels that are producing similar outputs and minimize the reduction in power output due to connection of a panel that is producing a lower output with respect to the other solar panels within the string. Additionally, the systems and methods as described herein are able to increase the output production by adjusting the location of a reflector with respect to the solar module. Not only does this allow for adjustment of the position to increase the output of the solar module, but it also provides a method for reducing the instability of the system in windy conditions and increasing the maintainability of the solar modules. Since the system can be dynamically adjusted, the output of the solar module can be controlled to be consistent and can be adjusted in response to changing weather or output request conditions.

Figure 1:
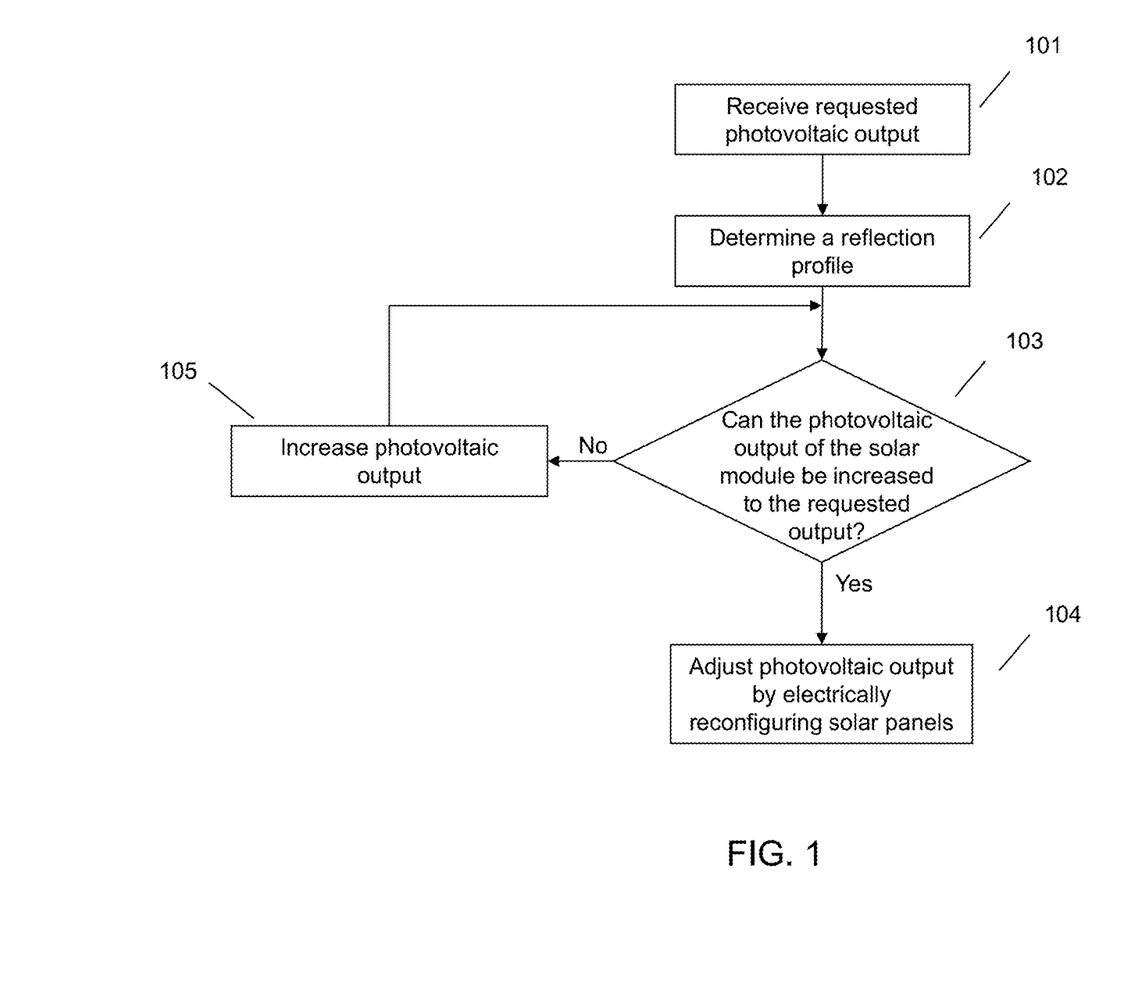
FIG. 1 illustrates a method of adjusting a stringing configuration of a solar module to meet a requested photovoltaic output.

In FIG. 1, at 101, the system may receive a requested photovoltaic output for at least one solar module. The photovoltaic output may be used to set the photovoltaic output reference. The output reference may be the output that the solar module is attempting to match. The output reference may be based upon different parameters. One parameter may include an output requested by the electrical grid. For example, the electrical grid may expect a particular power production from the solar energy generation facility. The solar energy generation facility may then determine what the output needs to be from each solar module in order to meet the demand by the electrical grid. Another parameter may include the geographical location of the solar module. For example, the location of the solar module may determine how much sun will shine, either directly or indirectly, on the solar module which will then determine the maximum value of output power that the module can provide. At 101, the system may either consider the requested photovoltaic output or it may try to maximize the output from all the solar modules based on ground coverage ratio (GCR) and shadow constraints.

Another parameter may include the configuration of the solar module and the, if any, photonic harvester. If the solar module includes a photonic harvester, the configuration of the photonic harvester with respect to the solar module may influence the reflection profile and/or the amount of irradiance on the solar module. Additionally, the location of the solar module and/or photonic harvester with respect to other solar modules or photonic harvesters may be considered when identifying a possible power output of the solar module, because other photonic harvesters may provide diffused irradiance onto the solar module even though the reflector is not directly positioned to reflect direct irradiance onto the solar module. In other words, if the back of the photonic harvester is suitable for providing some reflective qualities (e.g., the back is painted white which provides some reflective properties, the back includes a somewhat reflective surface, etc.), the back of the photonic harvester may reflect diffused irradiance onto the solar module. Additionally, the type of photonic harvester may be taken into account when identifying the reflection profile or how the reflection profile may be modified. For example, the photonic harvester may be an east-west harvester (e.g., a harvester positioned in an east-west direction, etc.), north-south harvester (e.g., a harvester positioned in a north-south direction, etc.), or macro harvester (e.g., a harvester that spans across multiple modules, etc.). Each of these different harvesters may be able to be controlled in different ways and, therefore, the reflection profile may be adjusted based upon the type of harvester that is included in the system.

Other parameters may include maintenance constraints (e.g., does the module need to be put out-of-service to perform maintenance, is the solar module out-of-service, how large is the maintenance equipment needed to perform the maintenance, etc.), operating constraints (e.g., the maximum possible output of the solar module, the power bid provided by the solar generation facility, etc.), temperature profile of the harvester or solar module (e.g., if a portion of the module is above a predetermined temperature the reflector may be adjusted to reflect less light on that portion, etc.), shadow profile or ratio (e.g., if a portion is within a shadow of another object the reflector may be moved to account for this shadow, etc.), ground coverage ratio (GCR) (e.g., the amount of land covered by the module and reflector, etc.), and the like.

Figure 2:
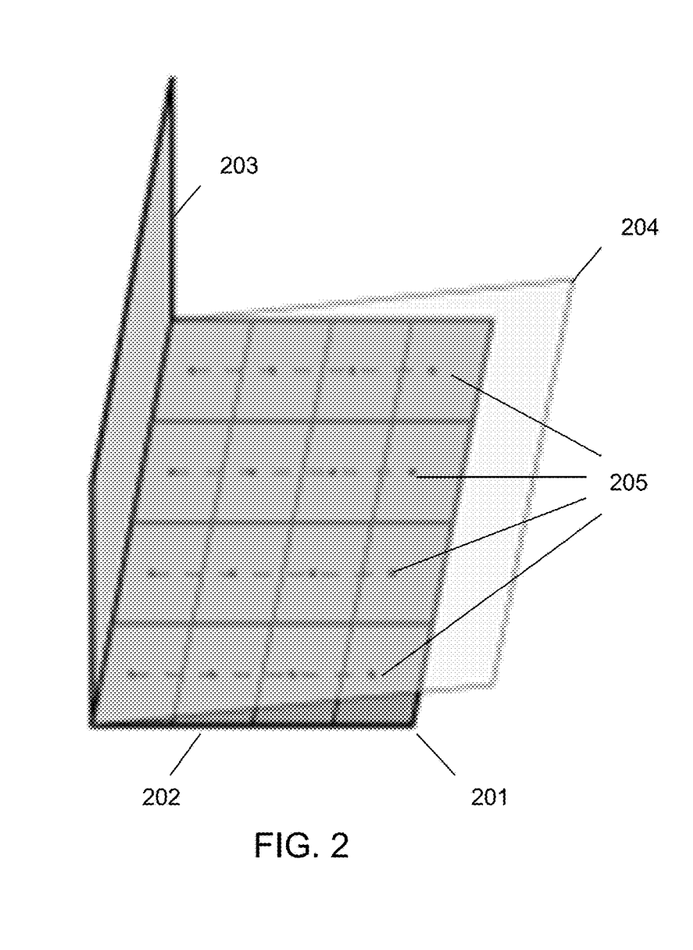
FIG. 2 illustrates an example solar module, photonic harvester, reflection profile, and stringing configuration.

Each of the solar modules may include a plurality of solar panels, for example, as illustrated in FIG. 2. The solar module 201 may include a plurality of solar panels, for example, at 202. In this simplified illustration, the solar module 201 includes sixteen solar panels. The illustration of FIG. 2 also illustrates a photonic harvester 203 which can be adjusted to provide a reflection profile 204 onto the solar module. The solar panels within the solar module are electronically connected together within a plurality of strings 205. In other words, a string of solar panels include a subset of the plurality of solar panels 202 that are electrically connected together. For example, as shown in FIG. 2, each row of solar panels 202 is connected within a separate string 205. Thus, using this example, the output of each of the strings will be equal to the output of the panel that produces the least output in that string. In other words, the overall photovoltaic output produced by the solar panels within a string corresponds to the photovoltaic production of the solar panel producing the lowest photovoltaic output in the string.

At 102 the system may identify a reflection profile for the solar module. As shown in FIG. 2, the reflection profile 204 is a description of an irradiance pattern with respect to the solar panels within the solar module. Stated differently, the reflection profile is an identification of where the sun is shining on the solar module and which portions of the solar panels are receiving sunlight. The reflection profile may also indicate how much irradiance the solar module is receiving at each solar panel. In other words, the reflection profile may describe an illumination pattern of light incident (e.g., direct light, diffused light, reflected light, etc.) onto the solar module. The reflection profile may provide an indication of which panels may produce a lower output due to the fact that the panel is not fully illuminated. Thus, using the example of FIG. 2, the bottom four solar panels do not receive sunlight that covers the entire solar panel. Accordingly, each of these panels will produce a reduced output as compared to a panel that is fully covered with the sunlight. The reflection profile may be identified using one or more sensors, for example, an image capture sensor, thermal sensor, light sensor, or the like. The reflection profile may be captured in real-time or may be estimated based upon weather conditions.

At 103, the system may determine whether the photovoltaic output of the solar module can be increased to meet the requested photovoltaic output. Determining whether the solar module can be adjusted to meet the requested output may be determined by comparing an output that can be produced by the solar module to the requested output. If the system determines at 103 that the photovoltaic output cannot be adjusted to meet the requested photovoltaic output, the system may at 105 increase the photovoltaic output towards the requested photovoltaic output, even though the output may not ever reach the requested output. For example, if the requested photovoltaic output is greater than the solar module can produce, the system may adjust the solar module to an optimal configuration to provide an increased output. If the system determines that the photovoltaic output can be adjusted to meet the requested output at 103, the system may adjust the configuration of the solar module to meet the requested output at 104.

Increasing the solar module configuration to meet the requested output may be accomplished using an optimization engine that modifies the string configuration of the plurality of strings within the solar module to an optimal configuration. A string configuration refers to the solar panels that are electronically connected together within a string. Thus, a reconfigured string configuration refers to the fact that one or more solar panels has been reassigned or electronically moved from one string to a different string. Electronically reassigning the string configuration may include changing the string configuration to couple solar panels together that will produce a similar or the same output. For example, electronic components (e.g., switches, inverter wiring, etc.) can be used to electrically connect one solar panel to one string and electrically disconnect the panel from another string. A similar output may refer to solar panels that produce a photovoltaic output within a predetermined range as compared to the other solar panels within the string. For example, the predetermined range may be that the photovoltaic output for each panel is within 5% or 10% of the photovoltaic output of another panel. It should be noted that the number of strings that existed before the reconfiguration does not have to match the number of strings that exist after the reconfiguration. For example, before the reconfiguration, the solar module may include five strings and after the reconfiguration the same solar module may include seven strings.

In other words, the string configuration may be modified so that the solar panels which are partially illuminated are eliminated from strings having fully illuminated solar panels. This reconfiguration then results in strings that produce an increased amount of power without being reduced by a single panel that is not producing a maximum amount of power. The stringing of panels may include different patterns and may include multiple patterns in the final configuration. For example, a configuration may include an entire string configuration, s-shaped strings, smaller strings at the ends of the modules, s-shaped strings at the ends of the modules and line strings in the middle of the modules, and the like.

One approach to determining the configuration is to identify the solar panels which are fully covered by the reflection profile, which can be determined using the sensors as discussed above. The panels can then be partitioned or grouped into groups that meet particular constraints. One example constraint may be that a single inverter may have a certain capacity and can therefore only support a specified number of panels. Another constraint may be the distance between panels or grouping feasibility. For example, grouping two panels that are on opposite sides of the solar module and no panels between may be difficult or impossible. Accordingly, the system may take into account the location of the panels with respect to the other panels and how possible it would be to group the panels. When identifying the possible partitions or groups, each panel may be included in more than one possible partition. After all feasible partitions are determined the system may select the partitions such that the overall objective function is minimized. In the selection of the partitions, each panel will be grouped into a single partition. In other words, while each panel may be included in multiple possible partitions, each panel may only belong to a single selected partition. Other approaches to determining the optimal configuration are contemplated and possible.

Figure 3:
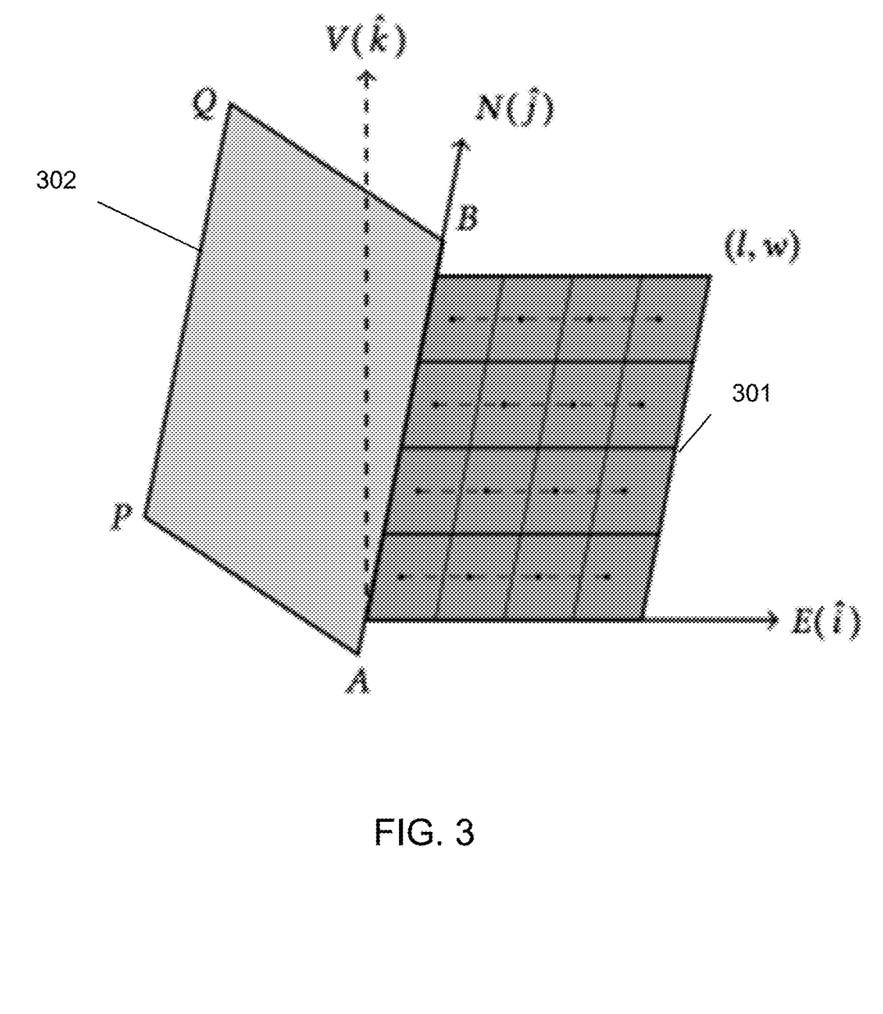
FIG. 3 illustrates an example solar module and photonic harvester.

The optimization engine may also control operation of a photonic harvester if included on the solar module system. As shown in FIG. 3, the solar module 301 may include a photonic harvester 302. The angle of the photonic harvester 302 with respect to the solar module 301 can be adjusted. Additionally, the photonic harvester 302 may be longer than the solar module 301, as shown in FIG. 3. This provides a greater reflection profile. The angle of the photonic harvester with respect to the solar module, the angle of the sun in the sky, the dimensions of the photonic harvester, and the position of the photonic harvester with respect to the solar module (e.g., distance of the harvester from the module, height of the harvester as compared to the module, etc.), may determine the reflection profile. Thus, changing any of these parameters changes the reflection profile.

Accordingly, the optimization engine may determine whether changing a parameter of the photonic harvester would result in a more optimal reflection profile. If the optimization engine determines that a more optimal reflection profile can be achieved, the system may adjust the photonic harvester with respect to the solar module. Adjusting the photonic harvester may include adjusting both or either of the horizontal or vertical spacing or gap between the module and the reflector, adjusting the height of the reflector with respect to the module, the angle of the reflector with respect to the solar module, and the like. Additionally, the photonic harvester may include small extension reflectors which may be adjusted independently from the remaining reflectors. Accordingly, the system may adjust the main reflector, the extension reflector, or both. Additionally, the size of the reflector and/or extension reflector may be adjusted by moving a portion of the reflector or extension behind another component. For example, in the case of the extension, the extension may be moved behind the main reflector thereby effectively, in the case that the entire extension is moved behind the main reflector, eliminating the extension.

The position, angle, and gap of the reflector, which may include the extension reflector, may also be based upon other conditions. For example, the optimization engine may receive expected or actual wind load conditions that will be or are being experienced by the solar module/reflector. In order to increase wind or structural stability, the position of the reflector may be adjusted to reduce the wind load. For example, to assist in reducing the wind load, the reflectors may be moved to create gaps between the reflector and module or extension and reflector. This may allow the wind to pass through the gap, thereby reducing the wind load on the structure. Modification of the position of the reflector may change the reflection profile. Accordingly, the optimization engine may reconfigure the string configuration based upon the new reflection profile. In other words, the reconfiguration of the string configuration and the reflection position may be done in real-time to account for any experienced weather conditions, real-time reflection profiles, and the like.

Some solar modules and/or reflectors may be on a track that allows the module to be moved with the position of the sun. The optimization engine as described herein can determine the angle and/or position for the module and/or reflector to result in the maximum output value. Additionally, the optimization engine may take into account diffused irradiance. Diffused irradiance may be that irradiance that results from irradiance reflecting off the back of the reflector. For example, the back of the reflector may be painted white or have a partially reflective surface that allows irradiance to reflect off the reflector. The optimization engine may take into account this possible diffused irradiance to position the reflectors such that most irradiance will be reflected onto the solar module. For example, based upon a position of reflectors and solar modules, one solar module may capture more irradiance through diffused irradiance than direct irradiance. For example, if the position of a reflector and the sun is such that the reflector cannot directly reflect the irradiance onto the solar module but a second reflector is in a position to provide diffused irradiance onto the solar module, the system may position the first reflector in a position that results in no direct irradiance but does not interfere with the diffused irradiance provided by the second reflector.

Figure 4:
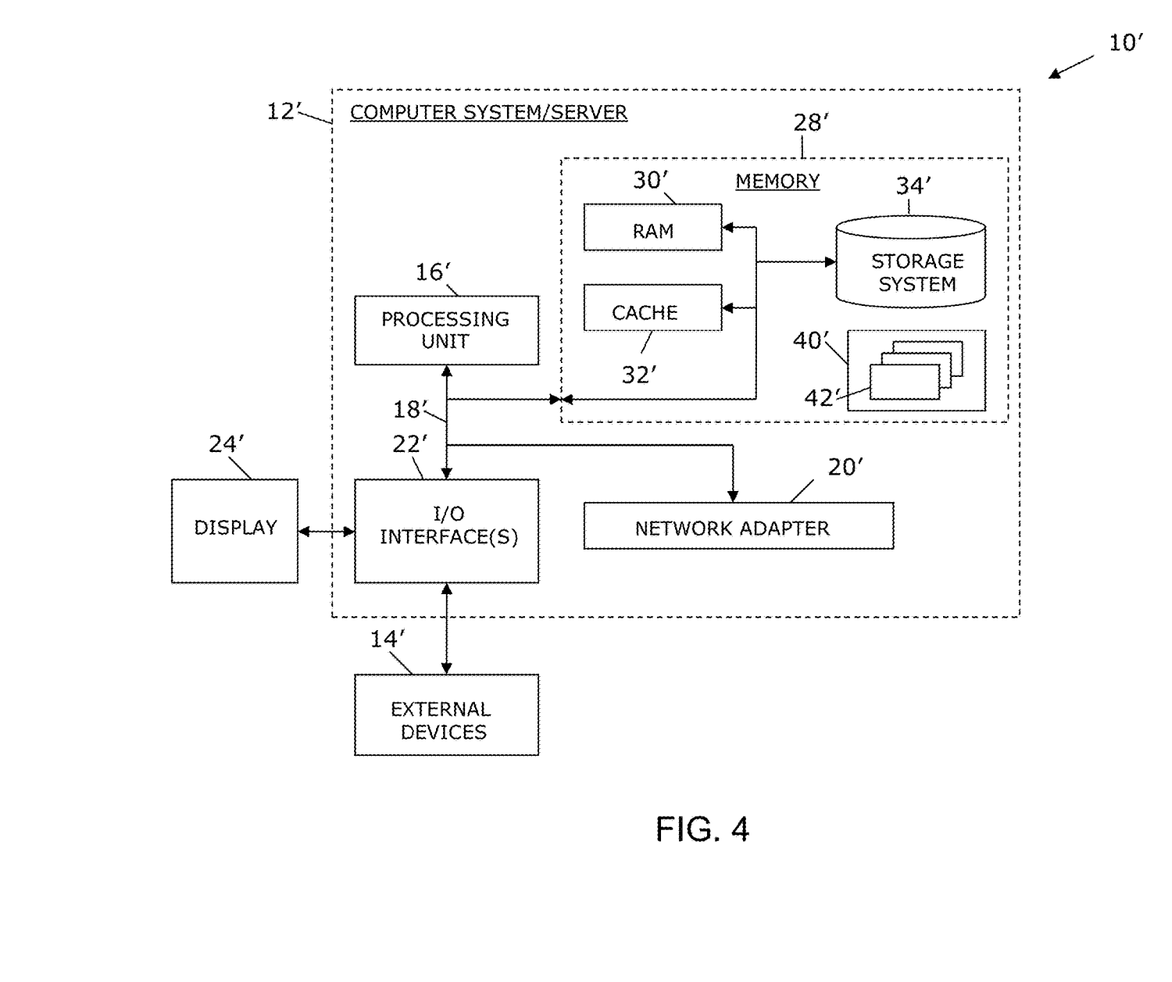
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving photovoltaic output from a solar module, the solar module comprising a plurality of solar panels electronically connected together by a plurality of strings, wherein each of the plurality of solar panels is assigned to only one of the plurality of strings, and wherein the photovoltaic output corresponding to any given one of the strings is limited by the lowest performing solar panel in said given one of the strings;
determining a reflection profile for the solar module, wherein the reflection profile describes an illumination pattern of light incident onto the solar module; and
increasing, based upon the determined reflection profile, the photovoltaic output of the solar module to match a requested photovoltaic output, wherein the increasing comprises electrically reassigning one or more solar panels within the solar module from one string to a different string, such that each string electrically ties together solar panels that produce a photovoltaic output within a predetermined range of each other.

2. The method of claim 1, wherein the solar module further comprises at least one photonic harvester.

3. The method of claim 2, wherein the at least one photonic harvester comprises at least one harvester selected from the group consisting of: an east-west harvester, a north-south harvester, and a macro harvester.

4. The method of claim 2, wherein the reflection profile is based upon the position of the at least one photonic harvester with respect to the solar module.

5. The method of claim 4, wherein the increasing photovoltaic output of the at least one solar module comprises dynamically adjusting the reflection profile by adjusting at least one of: the spacing of the at least one photonic harvester with respect to the solar module and the height of the at least one photonic harvester with respect to the solar module.

6. The method of claim 5, wherein the adjusting the spacing is based upon at least one of: maintenance constraints, operating constraints, temperature profile of the solar module, shadowing constraints, and ground coverage ratio constraints.

7. The method of claim 2, wherein the increasing photovoltaic output of the at least one solar module comprises (i) tracking the position of the sun and (ii) adjusting the position of the solar module and at least one photonic harvester based upon the tracked sun position.

8. The method of claim 2, comprising receiving information related to wind load experienced by the solar module.

9. The method of claim 8, comprising adjusting the location of the at least one photonic harvester with respect to the solar module based upon the wind load.

10. The method of claim 2, wherein the reflection profile is based, at least in part, on diffused irradiance from at least one adjacent photonic harvester and wherein the increasing the photovoltaic output of the at least one solar module comprises adjusting the position of the adjacent photonic harvester.

11. The method of claim 1, wherein the electrically reassigning one or more solar panels within the solar module from one string to a different string comprises identifying an optimal string configuration resulting in a maximum photovoltaic output by each of the strings.

12. An apparatus, comprising:
at least one processor; and
a computer readable storage medium having computer readable program code embodied therewith and executable by the at least one processor, the computer readable program code comprising:
computer readable program code configured to receive photovoltaic output from a solar module, the solar module comprising a plurality of solar panels electronically connected together by a plurality of strings, wherein each of the plurality of solar panels is assigned to only one of the plurality of strings, and wherein the photovoltaic output corresponding to any given one of the strings is limited by the lowest performing solar panel in said given one of the strings;
computer readable program code configured to determine a reflection profile for the solar module, wherein the reflection profile describes an illumination pattern of light incident onto the solar module; and
computer readable program code configured to increase, based upon the determined reflection profile, the photovoltaic output of the solar module to match a requested photovoltaic output, wherein the increasing comprises electrically reassigning one or more solar panels within the solar module from one string to a different string, such that each string electrically ties together solar panels that produce a photovoltaic output within a predetermined range of each other.

13. A computer program product, comprising:
a computer readable storage medium having computer readable program code embodied therewith, the computer readable program code executable by a processor and comprising:
computer readable program code configured to receive photovoltaic output from a solar module, the solar module comprising a plurality of solar panels electronically connected together by a plurality of strings, wherein each of the plurality of solar panels is assigned to only one of the plurality of strings, and wherein the photovoltaic output corresponding to any given one of the strings is limited by the lowest performing solar panel in said given one of the strings;
computer readable program code configured to determine a reflection profile for the solar module, wherein the reflection profile describes an illumination pattern of light incident onto the solar module; and
computer readable program code configured to increase, based upon the determined reflection profile, the photovoltaic output of the solar module to match a requested photovoltaic output, wherein the increasing comprises electrically reassigning one or more solar panels within the solar module from one string to a different string, such that each string electrically ties together solar panels that produce a photovoltaic output within a predetermined range of each other.

14. The computer program product of claim 13, wherein the solar module further comprises at least one photonic harvester and wherein the reflection profile is based upon the position of the at least one photonic harvester with respect to the solar module.

15. The computer program product of claim 14, wherein the increasing a photovoltaic output of the at least one solar module comprises dynamically adjusting the reflection profile by adjusting at least one of: the spacing of the at least one photonic harvester with respect to the solar module and the height of the at least one photonic harvester with respect to the solar module.

16. The computer program product of claim 14, wherein the increasing photovoltaic output of the at least one solar module comprises dynamically adjusting the reflection profile by adjusting at least one of: the spacing of the at least one photonic harvester with respect to the solar module and the height of the at least one photonic harvester with respect to the solar module.

17. The computer program product of claim 14, wherein the increasing a photovoltaic output of the at least one solar module comprises (i) tracking the position of the sun and (ii) adjusting the position of the solar module and at least one photonic harvester based upon the tracked sun position.

18. The computer program product of claim 14, comprising receiving information related to wind load experienced by the solar module and adjusting the location of the at least one photonic harvester with respect to the solar module based upon the wind load.

19. The computer program product of claim 13, wherein the electrically reconfiguring one or more solar panels within the solar module from one string to a different string comprises identifying an optimal string configuration resulting in a maximum photovoltaic output by each of the strings.

20. A method, comprising:
utilizing at least one processor to execute computer code that performs the steps of:
receiving information related to a desired photovoltaic output of a solar module comprising at least one photonic reflector, wherein the solar module comprises a plurality of solar panels electronically connected together by a plurality of strings, wherein each of the plurality of solar panels is assigned to only one of the plurality of strings, and wherein the photovoltaic output corresponding to any given one of the strings is limited by the lowest performing solar panel in said given one of the strings;

identifying a photonic profile with respect to the solar module, wherein the photonic profile identifies (i) the intensity of sunlight on each panel of the solar module and (ii) the position of the sunlight with respect to each of the solar panels of the solar module; and adjusting photovoltaic output of the solar module by adjusting the photonic reflector, wherein the adjusting the photonic reflector comprises adjusting at least one characteristic of the photonic reflector to create a new photonic profile, wherein the new photonic profile comprises one resulting in an increase in the photovoltaic output as compared with a previous photonic profile; and wherein the adjusting comprises electrically reassigning one or more solar panels within the solar module from one string to a different string such that each string comprises (i) solar panels producing a photovoltaic output within a predetermined range of each of the other solar panels within the string and (ii) decreases a loss of photovoltaic output due to the azimuth effect.

\* \* \* \* \*